B. M. Ely. Sheet 2, 2 Sheets.
Parallel Cultivator.
N°. 87,401. Patented Mar. 2, 1869.

Witnesses:
Chs. A. Sinclair
S. R. Carter

Inventor
Benjamin M. Ely

United States Patent Office.

BENJAMIN M. ELY, OF PERRY, MISSOURI, ASSIGNOR TO HIMSELF, L. T. TULLY, AND WILLIAM A. AND LYMAN P. MUNGER.

Letters Patent No. 87,401, dated March 2, 1869.

IMPROVEMENT IN CULTIVATORS.

The Schedule referred to in these Letters Patent and making part of the same.

*To all whom it may concern:*

Be it known that I, BENJAMIN M. ELY, of the town of Perry, in the county of Ralls, and State of Missouri, have invented a new and useful Improvement in Corn-Cultivators; and I do hereby declare that the following is a full, clear, and exact description of the construction and operation of the same, reference being had to the annexed drawings, making part of this specification, in which—

Figure 1:
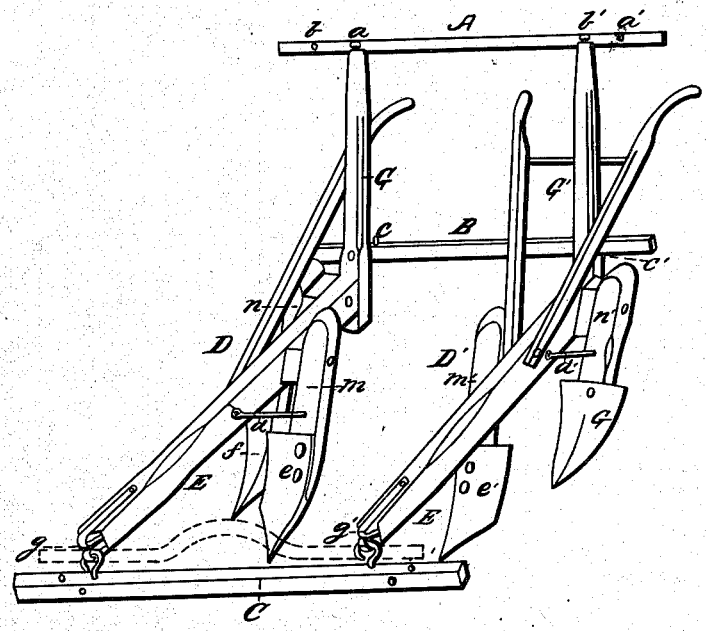
Figure 2:
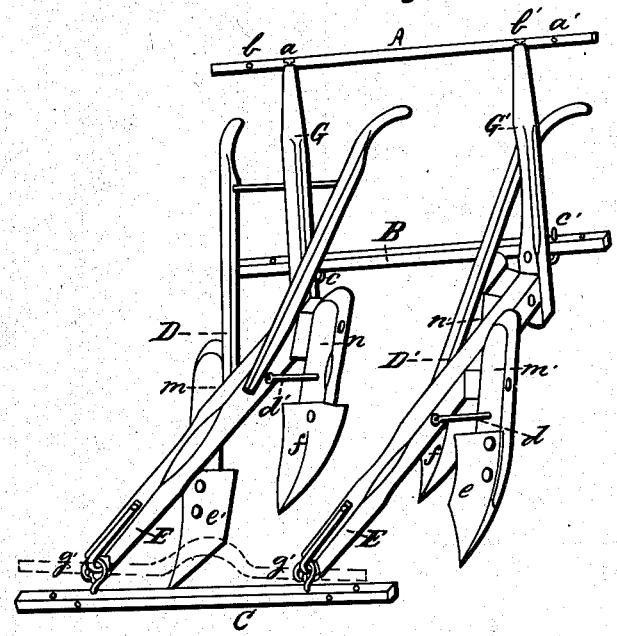
Figure 3:

Figure 1 is a perspective view of a double-convertible corn-cultivator constructed with my improvements, and Figure 2 is a like view of the same, but with a transposition of the parts thereof.

The nature of my invention consists in so constructing a corn-cultivator that it may be used as a whole, and to cultivate or stir up the soil on both sides of a row of corn at the same operation, whether the corn be high or low, (or to stir up the soil at one operation between adjacent rows,) and present, at will, either the shovel-shaped tooth or the mould-board-shaped tooth to the corn-rows, or the implement may be easily separated into two parts, and each used as a distinct cultivator.

In the drawings—

A and B represent two bars, which are fastened to the two halves or parts of the cultivator in the rear.

C represents the bar, or evener, which connects the two beams, E E, in front.

$g$ $g'$ are clevises.

$n$ $n'$ are the standards to which the shovel-shaped teeth are attached, and $m$ $m'$ are the standards to which the mould-board-shaped teeth are attached.

D D' are the two halves or parts composing the implement.

Fig. 2 represents the implement with the two parts D D' reversed or transposed.

I construct the bar A with a series of holes in and near each end of it, as at $b$ $a$, $b'$ $a'$, through which bolts or staples may be passed, in order to fasten the bar to the tops of the uprights G G', so that the distance between the uprights may be regulated as desired.

Holes are also bored vertically in the bar B, for a similar purpose, for the insertion of the hooks $c$ $c'$, by which it is attached to the uprights.

The uprights G G' should also be perforated with several holes, between $c$ $c'$ and $a$ $a'$, so that by changing the hooks $c$ $c'$ in the holes, the bar B may be raised or lowered, according to the heights of the corn-plants.

The bar C should be made of sufficient dimensions to afford it the required stiffness and strength, and, like the bars A and B, it should be perforated with several holes, in and near each end, so that, by changing the hooks $h$ $h'$ in the holes, the distance between the beams E and E may be regulated.

These three bars, the two uprights, and the beams, constitute the frame of the cultivator, and hold it together.

The draught-power may be applied to the bar C in any proper manner.

By means of the notched clevises $g$ $g'$, the depth of the teeth in the ground is regulated.

The bar C may be made straight; but when it is desired that the cultivator shall pass with its centre above the corn, it may be made to bow up in the centre, as indicated by the dotted lines in the drawings, so as to avoid breaking the plants when they shall have become large.

The teeth $e$ $e'$ and $f$ $f$ may be made of any suitable metal, two of them in the shovel-form, and the other two in the mould-board form, and fastened to the standards $n$ $n'$ and $m$ $m'$, as indicated in the drawings.

When the implement is used in its double form, it may be drawn by two animals, one travelling on each side of the corn-row, and the centre passing over the plants; or it may be drawn by a single animal, and the teeth made to stir up the whole surface between two adjacent rows of corn.

If the corn-plants be very young and small, the implement may be used as represented in fig. 1, the bar-sides of the teeth $e$ $e'$ being brought as near to each other as may be desired, by the means before described.

The bar-sides of these teeth may be run very near the plants, just skimming off the crust of the soil, and including the young weeds, while the shovel-shaped teeth may be made to run more or less deep, by means of the nuts and screws upon the rods $d$ $d'$, and to stir up the soil, but at such a distance from the plants as not to injure them.

Reference is had here to running the centre of the implement over the corn-row; but if it be desired to have it pass between adjacent rows, then, by transposing the parts D D', as in fig. 2, the bar-sides of the mould-board-shaped teeth will run next the corn, while the shovel-shaped teeth will stir up the soil in the "middle."

Moreover, the standards $m$ $m'$ and $n$ $n'$, being of the same form and dimensions, and the means of fastening them to the beams being the same, the changes desired in the relative positions of the teeth may be effected by changing the standards themselves.

Again, it is obvious that the two parts D D' may be separated, and each used as a separate implement, when desired.

The frame before described is calculated to hold the teeth steady, and secure uniformity in their action, while in operation, whether run deep or shallow.

What I claim, and desire to secure by Letters Patent, is—

1. A corn-cultivator, so constructed, of two equal and similar parts D D', which may be easily transposed, so that one may take the place of the other, that it can be used either as one implement or two distinct implements, substantially as and for the purposes described.

2. The adjustable bars A and B, when used in the construction of a double cultivator, constructed substantially as and for the purpose described.

3. The adjustable bar C, when used in the construction of a double corn-cultivator, constructed substantially as and for the purpose described.

4. The standards $m\ m'$ and $n\ n'$, when so constructed as to be interchangeable, in a corn-cultivator, substantially as and for the purpose described.

5. The frame, composed of the bars A, B, and C, and the uprights G G', and beams E E, when used in the construction of a double corn-cultivator, substantially as and for the purposes described.

BENJAMIN M. ELY.

Witnesses:
 CHS. A. SINCLAIRE,
 S. R. CARTER.